May 16, 1933.    A. S. MANCIB    1,909,495
REGULATOR
Filed Feb. 3, 1931    3 Sheets-Sheet 1
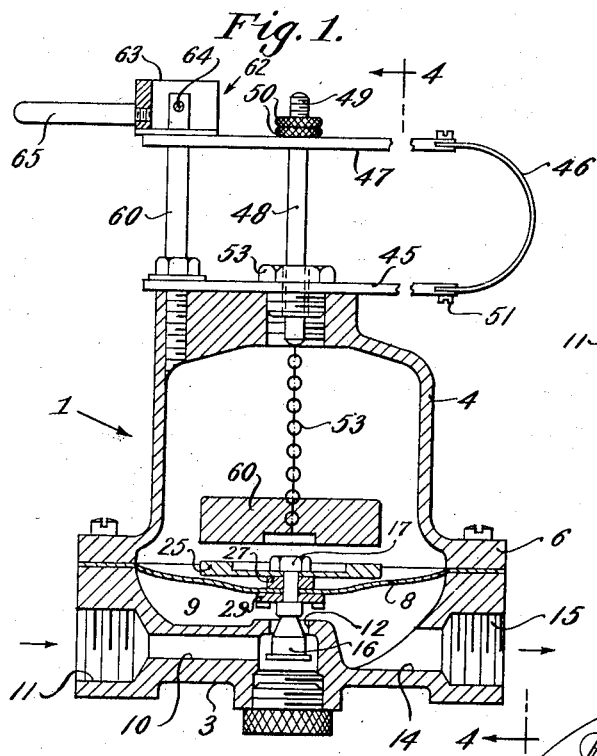
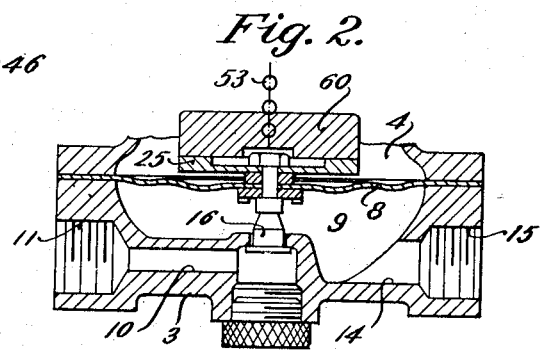
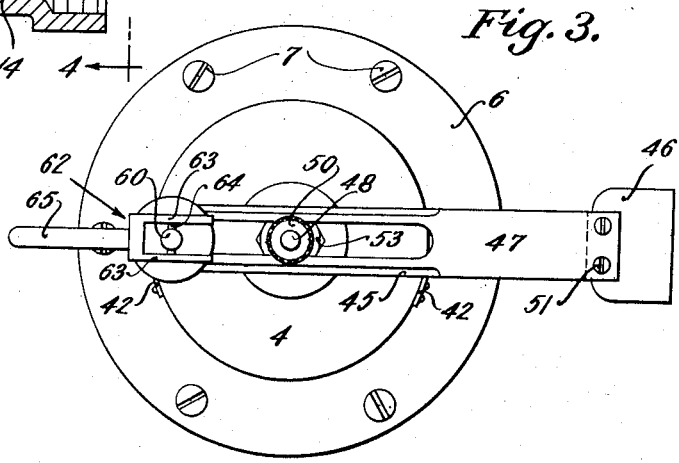
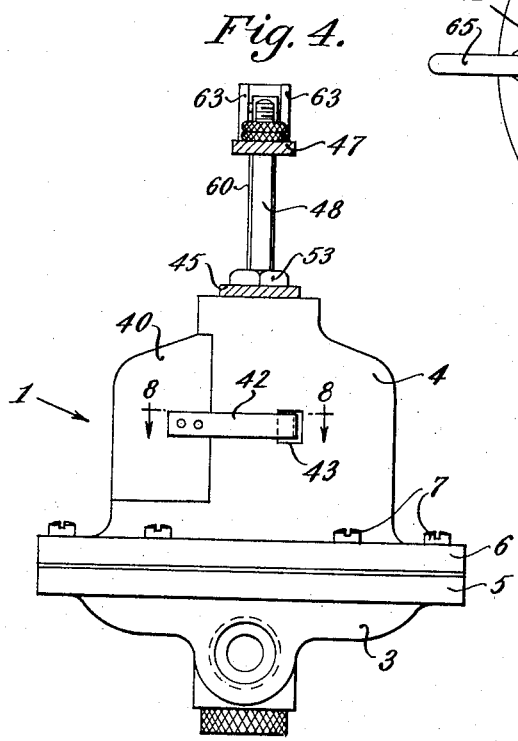
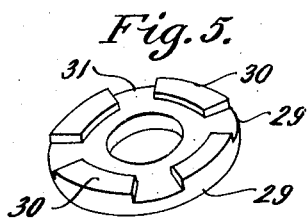
Inventor,
Alvin S. Mancib,
by Roberts, Cushman & Woodbury
Attys.

May 16, 1933.  A. S. MANCIB  1,909,495
REGULATOR
Filed Feb. 3, 1931   3 Sheets-Sheet 2

Inventor,
Alvin S. Mancib
by Roberts, Cushman & Woodberry
Attys.

May 16, 1933.　　　　A. S. MANCIB　　　　1,909,495
REGULATOR
Filed Feb. 3, 1931　　　3 Sheets-Sheet 3
Fig. 10.
Fig. 11.
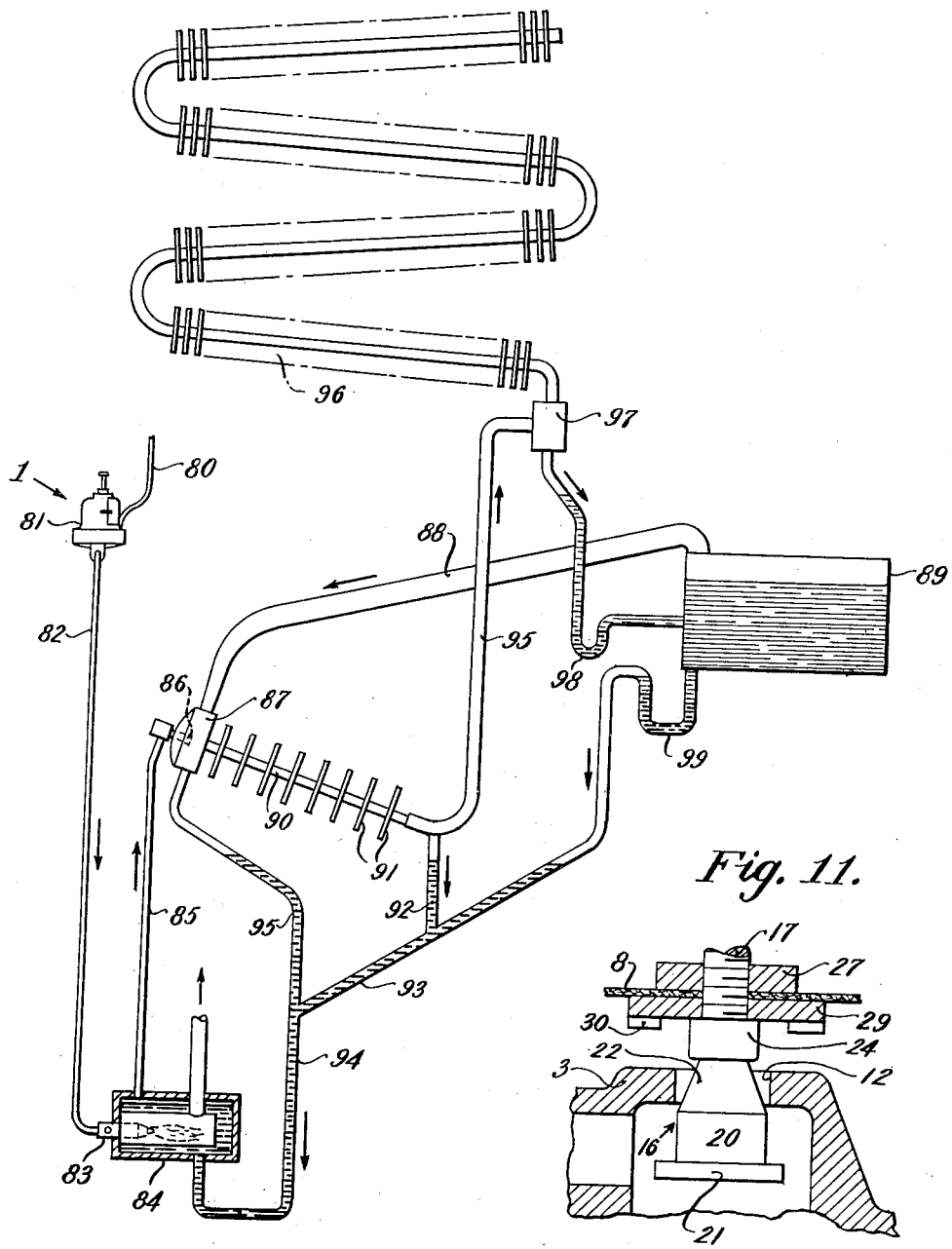
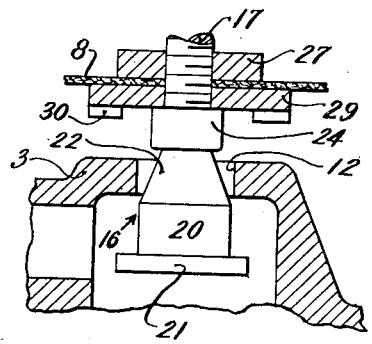
Inventor,
Alvin S. Mancib,
by Roberts, Cushman & Woodbury
Att'ys.

Patented May 16, 1933

1,909,495

UNITED STATES PATENT OFFICE

ALVIN S. MANCIB, OF SOMERVILLE, MASSACHUSETTS, ASSIGNOR TO COMSTOCK & WESCOTT, INC., OF BOSTON, MASSACHUSETTS, A CORPORATION OF MASSACHUSETTS

REGULATOR

Application filed February 3, 1931. Serial No. 513,141.

This invention relates to an improved device for controlling or regulating the flow of fluid which is supplied under pressure, and particularly to such a device for regulating the flow of gas supplied from a conventional gas main to a burner or similar device.

In accordance with the present invention, a fluid pressure and flow regulator is provided with a control valve which is movable to vary the flow of the fluid to a pressure chamber, the valve normally being effective in reducing the pressure of the gas and maintaining the pressure of the gas within the chamber at an equilibrium point below the pressure of the gas in the supply mains. From the pressure chamber the gas may flow to the burner or other point of use. Preferably the pressure chamber is provided with a distortable diaphragm, the intermediate portion of which supports a weight which tends to counteract the gas pressure and to move the valve toward an open position.

One important aspect of the invention relates to the association of exterior control means with the diaphragm so that the point of pressure equilibrium which is normally attained may be varied in response to external conditions. For this purpose a manual control may be provided to increase the pressure below the diaphragm and accordingly increase the rate of flow to the burner, or temperature responsive means may be employed to increase the pressure and rate of flow in response to a change in exterior temperature conditions. Preferably both a manual and a temperature responsive control are provided and are associated with common means to react against the pressure of the gas which tends to lift the diaphragm.

Further aspects of the invention relate to details of construction and to the general arrangement of the parts of the control device. For example, an arrangement is provided whereby the distortion of the valve in response to high gas pressure is ultimately effective in totally preventing the flow of gas to the burner so that under conditions of inordinate pressure of the mains, the gas flow may be at least temporarily interrupted, thus preventing an objectionably high rate of flow to the burner. Furthermore, the diaphragm is prevented from fully closing the inlet to the pressure chamber when the pressure acting upon the diaphragm is unusually low or when, for example, the gas is first turned on.

A device of this character may be conveniently employed in conjunction with a refrigerating system which derives its energy from a gas burner, such, for example, as a system disclosed in United States Patent No. 1,761,606 to Eastman A. Weaver. Such a control device may be conveniently employed in a control arrangement for a refrigerating system, such as is disclosed in the copending application of Lyman F. Whitney, Serial No. 512,405, filed Jan. 30, 1931.

Referring to the accompanying drawings:

Fig. 1 is a broken view, partly in section and partly in elevation, of my improved control device;

Fig. 2 is a sectional view of the pressure chamber and related parts showing the valve in its fully closed position;

Fig. 3 is a top view of the device;

Fig. 4 is a view partly in section and partly in elevation, indicated by line 4—4 of Fig. 1;

Fig. 5 is a perspective view of one part of the device;

Fig. 10 is a diagrammatic view of a refrigerating system to which my improved device may be applied; and Fig. 11 is an enlarged detail, partly in perspective and partly in elevation, showing the valve and related parts.

Figure 6:
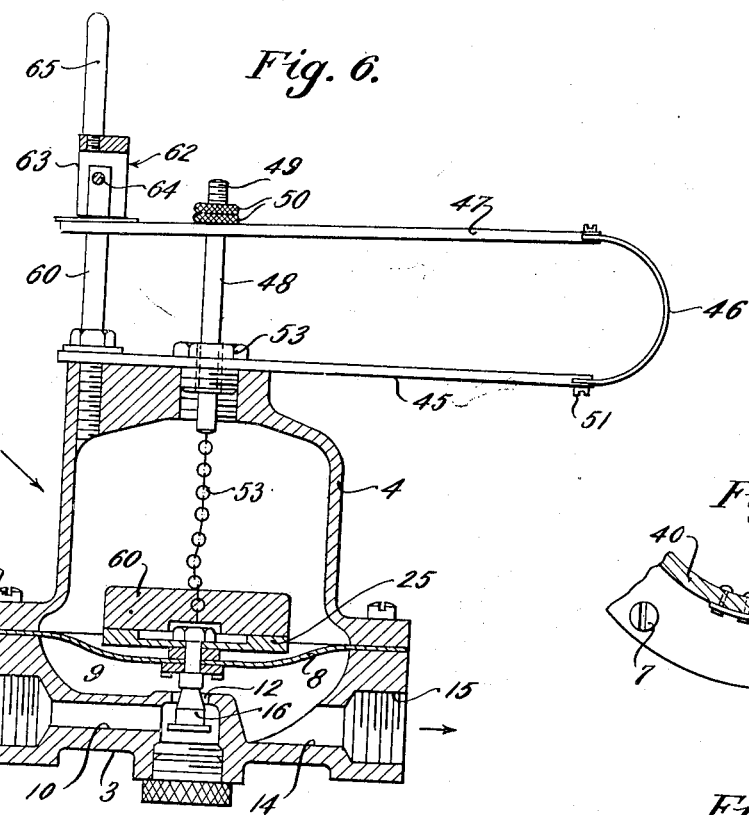
Figs. 6 and 7 are views similar to Fig. 1, showing certain parts of the device in different positions.

First referring more particularly to Figs. 1 and 4, my fluid flow regulator may comprise a casing designated in general by the numeral 1 and having a lower cup-like casing portion 3 defining the pressure chamber and an upper dome-like casing portion 4, the members 3 and 4 being provided with annular flanges 5 and 6 which are connected to each other by clamping screws 7. The perimetric portion of a flexible diaphragm 8 is clamped between the faces of flanges 5 and 6 so that this diaphragm forms the upper wall of the pressure chamber 9 within the lower casing member 3. The diaphragm may be formed of any suitable flexible material which is impervious to gas, such for example as leather. The casing member 3 is provided with an inlet duct portion 10 which, as shown in Fig. 1, may be substantially horizontally disposed and may be provided with internal threads 11 for connection to a fluid or gas supply pipe. The inner end of the duct 10 communicates through a valve opening 12 with the pressure chamber 9, the latter communicating with a duct 14 that is provided with internal threads 15 for connection to a gas outlet pipe.

A valve member 16 is disposed within the opening 12 and clamped to the central portion of the diaphragm 8 by a cap screw 17. The valve 16 is shown in greater detail in Fig. 11 and comprises a substantially cylindrical body portion 20 having a lower annular shoulder 21 and a frusto-conical upper extension 22. Above the frusto-conical extension 22 is a cylindrical portion 24 of somewhat smaller diameter than the portion 20.

Figure 9:
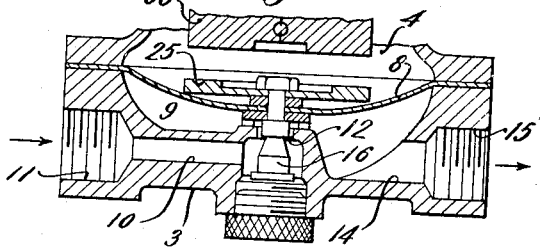
Fig. 9 is a sectional detail showing the valve in one of its various positions.

Referring now to Figs. 1 and 2, it may be seen that the screw 17 extends through a central opening in a weight 25 that is located above the diaphragm and that is spaced therefrom by a washer 27, the cap screw thus being effective in securing the weight to the diaphragm. The cap screw 17 also extends through a central opening in the diaphragm and through an opening in a castellated washer 29 which is shown in greater detail in Fig. 5. This washer has an intermediate part clamped against the upper part of the cylindrical portion 24 of valve member 16 and has a plurality of circumferentially disposed protuberances 30 between which are passages 31, the protuberances 30 being adapted to engage the wall of the pressure chamber surrounding the valve opening 12 when the central portion of the diaphragm falls to its lowest position, Fig. 9.

As shown in Fig. 1, valve 16 is normally so positioned that the frusto-conical part 22 thereof is disposed within the opening 12 so that any upward or downward movement of the valve causes a variation in the effective size of the valve opening and consequently a variation in the throttling effect imposed upon the fluid passing into the chamber 9. The cylindrical body portion 20 of the valve has a diameter that is slightly smaller than that of the opening 12 so that when this portion of the valve is disposed within the opening there may be a slight flow of fluid into the chamber 9. However, when the valve and diaphragm rise to their uppermost positions, the annular shoulder 21 upon the valve engages the casing wall surrounding the opening 12 entirely to prevent flow into the chamber 9, as shown in Fig. 2.

Figure 8:
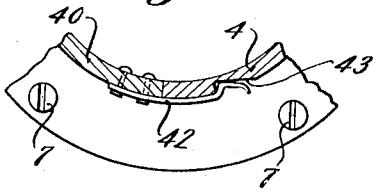
Fig. 8 is a section indicated by line 8—8 of Fig. 4.

Preferably a portion of the upper dome-like casing member 4 is a cut-away and a metal closure 40 normally occupies this cut-away portion of the casing. Closure 40 is secured in place by resilient snap elements 42, the ends of which engage recesses 43 in the outer face of the member 4, Fig. 8.

A bifurcated bar 45 preferably is secured to the top of the member 4 and a substantially U-shaped heat-responsive and resilient element 46 has one end or leg received in a slot in the outer end of the bar 45 and connected to the latter by screws 51. The upper leg of the element 46 is similarly connected to a similar bar 47. A spindle or vertically disposed rod 48 extends through the slots in bars 45 and 47 and has a threaded upper end 49 to which nuts 50 are applied, one of these nuts engaging the upper face of the bar 47. The lower end of this spindle is received in a bushing 53 that is threaded into an opening in the upper part of casing 4, the spindle 48 being slidable in this bushing and being connected to a flexible element such as a depending chain 53, the lower end of which is secured to a weight 60 that is disposed above the weight 25. Thus vertical movement of the spindle 48 is effective in causing the weight 60 to rest upon the weight 25 or to be suspended above the same or to be partially suspended and partially rest upon the weight 25. When the weight 60 is entirely supported by chain 53, the member 46 is thereby distorted from the shape it would normally possess at a given temperature; accordingly when member 60 initially contacts with member 25 in response to a change in the temperature of the air surrounding element 46, the latter still supports a part of the weight of member 60. As further distortion of member 46 takes place due to a further increase in temperature of the surrounding air, the tension on chain 53 becomes less, and more of the weight of member 60 is imposed upon the member 25 and the diaphragm. When the temperature of the surrounding air reaches a high point, the full weight of member 60 may act upon the diaphragm. Accordingly the force which the weights 25 and 60 impose upon the central part of the diaphragm 8 varies in accordance with the exact shape of the heat-responsive element 46 as determined by the temperature of the medium surrounding the same, such as the surrounding air.

Figure 7:
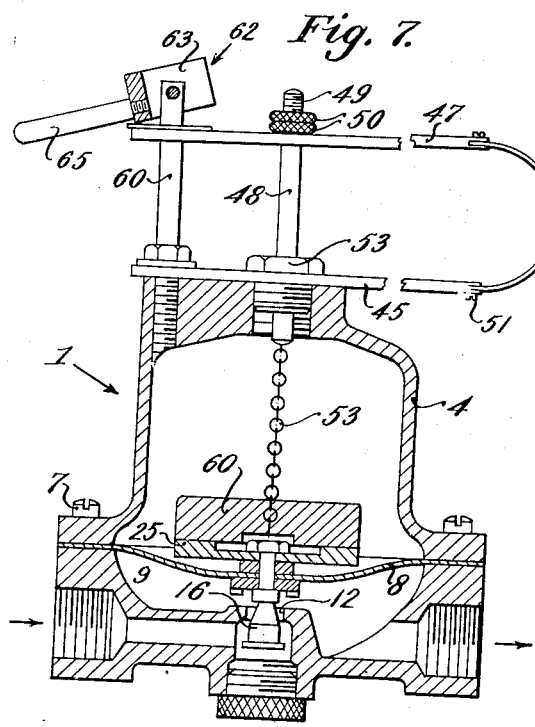

A stud 60 is secured to the upper part of casing member 4 and extends upwardly through the slot at the end of the bar 47. A U-shaped element 62 has rectangular leg portions 63 pivotally connected by pintle 64 to the upper end of the stud 60 and carries an outstanding handle 65. Under normal operating conditions the handle may be disposed as shown in Fig. 1 or Fig. 7, while, as shown in Fig. 6, the handle may be manually swung to a vertical position so that the ends of the elements 63 depress the end of bar 47 and thus permit the spindle 48 and weight 60 to move downwardly so that the weight 60 may be supported by the central part of diaphragm 8.

A device of this character may be conveniently applied to a refrigerating system such as is shown in Fig. 10, gas being supplied from the ordinary mains through the pipe 80 to the control device, which is designated in general by numeral 81, and passing from the latter to the outlet pipe 82 which is connected to a burner 83. The latter is associated with a boiler 84 containing a working fluid of the refrigerating system such as mercury. The mercury or propellant vapor rises through a tube 85 to an aspirator nozzle 86 which projects into a mixing chamber 87, the latter being connected by a vapor duct 88 to a cooler 89 containing a body of liquid refrigerant such as water. The propellant vapor issuing from nozzle 86 thus entrains vapor from the cooler, causing rapid evaporation and refrigeration. The vapor is passed into a funnel 90 which is provided with cooling fins 91 to condense substantially all of the propellant which may return to the boiler 84 through ducts 92, 93 and 94, the duct 95 being arranged to receive propellant particles that condense in the mixing chamber 87. The refrigerant vapor passes upwardly through duct 95 to the refrigerant condenser 96. The liquefied refrigerant flows back to the chamber 97 and from the bottom of the latter bubbles through a mercury trap 98 to the cooler. The upper part of pipe 93 may provide a mercury trap 99 connected to the bottom of cooler 89 so that stray mercury received by the cooler may be automatically returned to the propellant boiler.

In the operation of a device of this character, fluid under pressure, such as gas, may be received by the inlet duct 10, for example from the gas supply pipe 80, and may pass through the valve opening 12, the valve normally being positioned, for example as shown in Fig. 1, so that gas may flow upwardly through the opening into the pressure chamber 9, the exact position of the valve determining the rate of flow into the pressure chamber and the pressure existing therein. Assuming that the weight 25 is alone effective in depressing the central portion of diaphragm 8, the gas pressure in the chamber 9 will tend to reach a point of equilibrium determined by the weight 25 and under these conditions the valve will be held in a position to maintain such a pressure. If there is a change in the pressure of the gas being supplied to the inlet duct 10, however, the valve will automatically move to a new position and thus be effective in maintaining the equilibrium pressure. If the weight 60 is effective in aiding the weight 25 to depress the central portion of the diaphragm, the effective valve opening will increase and a new equilibrium pressure will be attained within the chamber 9 which is higher than the minimum pressure that is determined when the gas pressure beneath the diaphragm reacts only against weight 25.

Obviously the net effect of the weight 60 tending to depress the central part of the diaphragm varies in accordance with the thermal distortion of member 46. Thus when the heat-responsive element 46 contracts due to an increase in the temperature of the surrounding air, the spindle 48 slides downwardly, causing the weight 60 to impose a greater pressure upon the weight 25, thus tending to depress the central part of the diaphragm and the valve, opening the latter and permitting a greater flow of gas into chamber 9. Similarly when the handle 65 is swung to the position shown in Fig. 6 the weight 60 may be fully supported by the diaphragm and the valve depressed to a point where substantially the maximum flow of gas may take place.

This arrangement is particularly advantageous when employed in conjunction with a refrigerating system such as illustrated in Fig. 7, since the heat-responsive element 46 regulates the flow of gas to the burner in accordance with the temperature conditions of the system and particularly of the refrigerant condenser, thus affording an increase in the rate of refrigeration when the conditions of the system make this desirable in order to maintain the cooler at a continued low temperature. The manual control 65 which is also advantageous when the device is used in conjunction with such a refrigerating system, since it may be employed to cause an increased flow of gas and a resultant increase in the rate of refrigeration when an unusually ample refrigerating effect is desired as, for example, for the rapid freezing of ice cubes, frozen delicacies or the like.

The employment of a valve having a substantially cylindrical portion such as the cylindrical portion 20 of valve 16 permits the operation of a device of this character without objectionable chattering or fluttering of the valve. Under normal gas pressures in the supply duct 80 the valve 16 will tend to maintain substantially the same position; in other words, the normal variations in pressure in commercial gas supply mains ordinarily result in only a minute movement of the valve. Infrequently there may be a sudden surge of pressure in the incoming gas which may cause the valve to rise to the position shown in Fig. 2 wherein the annular shoulder 21 engages the wall of the chamber surrounding the valve opening, thus momentarily interrupting the flow of gas into the pressure chamber 9. Should the pressure of the incoming gas for any reason become inordinately low, the valve may assume the position shown in Fig. 9; the castellated washer 29 then rests upon the wall of the chamber surrounding the valve opening, and the passages 31 provided by this washer permit the flow of gas into the pressure chamber so that the diaphragm may readily rise in response to a rise in the pressure of the incoming gas. Furthermore, when the flow of gas to the governor is entirely interrupted, as when the gas is shut off, the parts will occupy the position shown in Fig. 9, the weight 25 then being supported by the castellated washer 29 and thus releasing the diaphragm from unnecessary strain.

It is evident that this invention provides a simple unitary control device to regulate the flow of gas to a burner despite variations in the gas main pressure and that the device also is adapted automatically to vary the rate of flow to suit the particular operating conditions or temperatures of the system to which the device is applied as, for example, a refrigerating system. Furthermore, the manual control may be employed to increase the rate of gas flow whenever desired.

It should be understood that the present disclosure is for the purpose of illustration only and that this invention includes all modifications and equivalents which fall within the scope of the appended claims.

I claim:

1. A gas flow regulator comprising a chamber, a diaphragm forming an upper wall of the chamber, the chamber having an inlet and an outlet, a movable valve varying flow through the inlet and connected to the central part of the diaphragm, a weight disposed above the diaphragm and opposing its upward distortion in response to gas pressure in the chamber, whereby the pressure automatically tends to reach an equilibrium point determined by the force of the weight upon the diaphragm, a resilient element distortable in response to temperature change, and connecting means through which the element tends to support the weight and thus be effective in varying the downward force of the weight upon the diaphragm, whereby the net force of the weight upon the diaphragm and the equilibrium pressure may change in response to a change in temperature of the element.

2. A device of the class described, comprising a casing providing a chamber, said chamber having a fluid inlet and a fluid outlet, a valve controlling the flow of fluid through the inlet, a diaphragm forming an upper wall of the chamber, a weight secured to the central part of the diaphragm and tending to distort the same downwardly, said valve being connected to the central part of the diaphragm, whereby the pressure within the chamber tends to reach a point of equilibrium to balance the pressure of the weight above the diaphragm suspending, means above the weight movably suspending to reduce the net effect of the weight upon the diaphragm and thus decrease the gas pressure within the chamber, and an exterior control operable to oppose the effect of said means and thus cause a change in the point of pressure equilibrium.

3. A device of the class described, comprising a casing providing a chamber, said chamber having a fluid inlet and a fluid outlet, a valve controlling the flow of fluid through the inlet, a diaphragm forming an upper wall of the chamber, a weight secured to the central part of the diaphragm and tending to distort the same downwardly, said valve being connected to the central part of the diaphragm, whereby the pressure within the chamber tends to reach a point of equilibrium to balance the pressure of the weight above the diaphragm, a second weight disposed above the first weight and movable from a position wherein it is spaced from the first weight to a position in contact therewith, and a temperature responsive element connected to the second weight and suspending it above the first weight or permitting it to contact the latter in accordance with different temperature conditions.

4. A device of the class described, comprising a casing providing a chamber, said chamber having a fluid inlet and a fluid outlet, a valve controlling the flow of fluid through the inlet, a diaphragm forming an upper wall of the chamber, a weight secured to the central part of the diaphragm and tending to distort the same downwardly, said valve being connected to the central part of the diaphragm, whereby the pressure within the chamber tends to reach a point of equilibrium to balance the pressure of the weight above the diaphragm, a second weight disposed above the first weight and movable from a position wherein it is spaced from the first weight to a position in contact therewith, a temperature responsive element connected to the second weight and suspending it above the first weight or permitting it to contact the latter in accordance with different temperature conditions, and a manual control for distorting the temperature responsive element independently of the temperature thereof to effect increase in gas pressure in the chamber when desired.

5. A device of the class described, comprising a casing providing a chamber, said chamber having a fluid inlet and a fluid outlet, a valve controlling the flow of fluid through the inlet, a diaphragm forming an upper wall of the chamber, a weight secured to the central part of the diaphragm and tending to distort the same downwardly, said valve being connected to the central part of the diaphragm, whereby the pressure within the chamber tends to reach a point of equilibrium to balance the pressure of the weight above the diaphragm, a second weight disposed above the first weight and movable from a position wherein it is spaced from the first weight to a position in contact therewith, a temperature responsive element distortable either in response to temperature change or to mechanical stress, a connecting member between said element and the second weight, said member being under tension when the weights are spaced and when they initially contact due to temperature distortion of the element, whereby the pressure of the second weight upon the first gradually increases in response to temperature change.

6. A device of the class described, comprising a casing providing a chamber, said chamber having a fluid inlet and a fluid outlet, a valve controlling the flow of fluid through the inlet, a diaphragm forming an upper wall of the chamber, a weight secured to the central part of the diaphragm and tending to distort the same downwardly, said valve being connected to the central part of the diaphragm, whereby the pressure within the chamber tends to reach a point of equilibrium to balance the pressure of the weight above the diaphragm, a second weight disposed above the first weight and movable from a position wherein it is spaced from the first weight to a position in contact therewith, a temperature responsive element distortable either in response to temperature change or to mechanical stress, a connecting member between said element and the second weight, said member being under tension when the weights are spaced and when they initially contact due to temperature distortion of the element, whereby the pressure of the second weight upon the first gradually increases in response to temperature change, and manually operable means for mechanically distorting the element to vary the pressure independently of the temperature responsive action.

7. A gas flow regulator comprising a chamber, a diaphragm forming an upper wall of the chamber, the chamber having an inlet opening and an outlet, a movable valve disposed in the inlet to vary flow through the inlet, said valve being connected to the central part of the diaphragm, said valve having a substantially cylindrical portion slightly smaller than the valve opening, and an upwardly tapered portion above the cylindrical portion, said tapered portion normally being positioned in the opening to vary the flow therethrough, a weight disposed above the diaphragm and opposing its upward distortion in response to gas pressure in the chamber, whereby the pressure automatically tends to reach an equilibrium point determined by the force of the weight upon the diaphragm.

8. A gas flow regulator comprising a chamber, a diaphragm forming an upper wall of the chamber, the chamber having an inlet opening and an outlet, a movable valve disposed in the inlet to vary flow through the inlet, said valve being connected to the central part of the diaphragm, said valve having a substantially cylindrical portion slightly smaller than the valve opening, and an upwardly tapered portion above the cylindrical portion, said tapered portion normally being positioned in the opening to vary the flow therethrough, a weight disposed above the diaphragm and opposing its upward distortion in response to gas pressure in the chamber, whereby the pressure automatically tends to reach an equilibrium point determined by the force of the weight upon the diaphragm, said valve having an enlarged lower end portion to close the valve opening in response to abnormal gas pressure.

9. A gas flow regulator comprising a chamber, a diaphragm forming an upper wall of the chamber, the chamber having an inlet and an outlet, a movable valve varying flow through the inlet and connected to the central part of the diaphragm, a resilient element distortable in response to temperature changes, a weight suspended from said element, the element cooperating with the diaphragm in supporting the weight, the net effect of the weight upon the diaphragm being variable in response to the thermal distortion of said element, whereby the pressure of fluid beneath the diaphragm may vary in response to variations in the temperature of said element.

10. A gas flow regulator comprising a chamber, a diaphragm forming an upper wall of the chamber, the chamber having an inlet and an outlet, a movable valve varying flow through the inlet and connected to the central part of the diaphragm, a resilient element distortable in response to temperature changes, a weight suspended from said element, the element cooperating with the diaphragm in supporting the weight, the net effect of the weight upon the diaphragm being variable in response to the thermal distortion of said element, whereby the pressure of fluid beneath the diaphragm may vary in response to variations in the temperature of said element, a control part manually movable to permit the selective manual distortion of said element, thereby to permit a change in the rate of fluid flow into said chamber irrespective of the temperature of said element.

Signed by me at Boston, Massachusetts this 30th day of January, 1931.

ALVIN S. MANCIB.